United States Patent
Chen et al.

(10) Patent No.: US 12,162,020 B2
(45) Date of Patent: Dec. 10, 2024

(54) HIGH CRUSHING EFFICIENCY MEDICAL WASTE TREATMENT MACHINE

(71) Applicant: ZHEJIANG WEIDUN ENVIRONMENTAL TECHNOLOGY CO., LTD., Hangzhou (CN)

(72) Inventors: Yiming Chen, Hangzhou (CN); Weixing Chen, Hangzhou (CN); Junfeng Liu, Hangzhou (CN); Guanzhong Huang, Hangzhou (CN)

(73) Assignee: ZHEJIANG WEIDUN ENVIRONMENTAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/670,396

(22) Filed: May 21, 2024

(65) Prior Publication Data
US 2024/0299950 A1 Sep. 12, 2024

Related U.S. Application Data

(63) Continuation of application No. PCT/CN2022/142233, filed on Dec. 27, 2022.

(30) Foreign Application Priority Data

Nov. 22, 2021 (CN) .......................... 202111388534.2

(51) Int. Cl.
*B02C 18/18* (2006.01)
*B02C 18/00* (2006.01)
(Continued)

(52) U.S. Cl.
CPC ...... *B02C 19/0075* (2013.01); *B02C 18/0084* (2013.01); *B02C 18/0092* (2013.01);
(Continued)

(58) Field of Classification Search
CPC . B02C 19/0075; B02C 18/18; B02C 18/2291; B02C 18/0092; B02C 18/0084; B02C 2201/06
See application file for complete search history.

(56) References Cited

U.S. PATENT DOCUMENTS

| | | | | |
|---|---|---|---|---|
| 4,979,683 A | * | 12/1990 | Busdeker | ............ B02C 19/0075 241/37.5 |
| 2008/0063580 A1 | * | 3/2008 | von Lersner | ....... B02C 19/0075 422/309 |

FOREIGN PATENT DOCUMENTS

| | | | | |
|---|---|---|---|---|
| CN | 205851028 U | * | 1/2017 | ......... B02C 19/0075 |
| CN | 108212363 A | | 6/2018 | |

(Continued)

*Primary Examiner* — Faye Francis
(74) *Attorney, Agent, or Firm* — Westbridge IP LLC

(57) ABSTRACT

A high crushing efficiency medical waste treatment machine includes a crushing cylinder, a crushing knife set provided at the bottom of the crushing cylinder, an intermittent material discharge mechanism set on one side of the crushing knife set, a pressurizing mechanism slidingly set along the axis of the crushing cylinder on the other side of the crushing knife set. The pressurizing mechanism includes a mounting frame slidingly connected to the inner wall of the crushing cylinder, the mounting frame rotatably connected to a material tumbling plate made of magnetic material; when the intermittent material discharging mechanism discharges material, the pressurizing mechanism moving in a direction close to the crushing knife set; when the intermittent material discharges mechanism stops discharging material, the material tumbling plate rotates.

4 Claims, 6 Drawing Sheets

(51) Int. Cl.
*B02C 18/22* (2006.01)
*B02C 19/00* (2006.01)

(52) U.S. Cl.
CPC .......... *B02C 18/18* (2013.01); *B02C 18/2291* (2013.01); *B02C 2201/06* (2013.01)

(56) References Cited

FOREIGN PATENT DOCUMENTS

| CN | 109248902 A | * | 1/2019 | ......... B02C 19/0075 |
|----|-------------|---|--------|------------------------|
| CN | 109954746 A | * | 7/2019 | ........... B09B 5/0075 |
| CN | 110523499 A |   | 12/2019 | |
| CN | 112892800 A | * | 6/2021 | ......... B02C 19/0075 |
| CN | 213644437 U | * | 7/2021 | ....... B02C 18/0084 |
| CN | 220346048 U | * | 1/2024 | ......... B02C 19/0075 |

\* cited by examiner

HIGH CRUSHING EFFICIENCY MEDICAL WASTE TREATMENT MACHINE

CROSS-REFERENCE TO RELATED APPLICATIONS

The present application is a continuation of International Application No. PCT/CN2022/142233, filed on Dec. 27, 2022, which claims priority to Chinese Patent Application No. 202111388534.2, filed on Nov. 22, 2021. The disclosures of the above-mentioned applications are incorporated herein by reference in their entireties.

TECHNICAL FIELD

The present application relates to the field of medical recycling equipment, specifically, to a high crushing efficiency medical waste treatment machine.

BACKGROUND

Hospitals consume a large amount of medical supplies every day, most of these medical supplies have been in contact with patient's blood or bodies, etc., and are discarded after use, forming a large amount of medical waste, which contains a large number of viruses and germs, if not properly handled, will cause pollution to the environment, and may also become a source of epidemic outbreaks. To improve resource utilization, medical waste treatment machine is often used to crush and recycle plastic and glass products from medical waste. However, due to the diversity of medical waste materials, plastic waste will contain some metal products, which will damage the crushing blade of the treatment machine, affecting its efficiency; meanwhile due to the high toughness of plastic products, it is difficult to achieve complete crushing, the treatment will produce sticky and stretched objects, which will hinder the subsequent recycling work. It is urgent to design a medical waste treatment machine that reduces blade damage and achieves thorough crushing.

SUMMARY

The purpose of the present application is to address the issues in existing technology where plastic waste may contain some metal products, which can damage the crushing blades of disposal machines and affect their efficiency. Additionally, the processed waste may result in sticky and stretched objects, hindering subsequent recycling efforts. This invention aims to provide a medical waste disposal machine that reduces blade damage and achieves thorough crushing.

To achieve the above purpose, the technical solution adopted by the present application is as follows.

A high crushing efficiency medical waste treatment machine includes a crushing cylinder, a crushing knife set arranged at a bottom of the crushing cylinder, an intermittent material discharge mechanism arranged on one side of the crushing knife set, a pressurizing mechanism slidingly arranged along an axis of the crushing cylinder on the other side of the crushing knife set; the pressurizing mechanism includes a mounting frame slidingly connected to an inner wall of the crushing cylinder, a material tumbling plate rotatably connected within the mounting frame, with a rotation axis of the material tumbling plate perpendicular to the axis of the crushing cylinder, and the material tumbling plate being made of magnetic material; when the intermittent material discharging mechanism discharges material, the pressurizing mechanism moving in a direction towards the crushing knife set, and when the intermittent material discharging mechanism stops discharging material, the material tumbling plate rotates.

Further, the top of the crushing cylinder is provided with a closure mechanism, the closure mechanism includes a closure cap, one end of the closure cap is hinged to the crushing cylinder, the other end of the closure cap is provided with a snap between the closure cap and the crushing cylinder, and the bottom end of the crushing cylinder is fixedly connected with a base.

Further, the crushing cylinder is communicatively connected with a disinfection mechanism, the disinfection mechanism includes an intake pipe with one end communicating with the crushing cylinder, the other end of the intake pipe is communicatively connected to a disinfection device, and an exhaust pipe with one end communicating with the crushing cylinder, and the other end of the exhaust pipe is communicatively connected to a recycling device.

Further, the crushing knife set includes a mounting member fixedly connected to the inner wall of the crushing cylinder, a power member is arranged on the mounting member, and the output end of the power member is located in the axis of the crushing cylinder, the output end of the power member is provided with two sets of crushing knives along the axial direction, with the two sets of crushing knives being staggered in a circumferential direction.

Further, the pressurizing mechanism includes two electromagnetic tracks symmetrically arranged in the inner wall of the crushing cylinder, each electromagnetic track is slidably connected with an electromagnetic slider; the mounting frame is fixedly connected to the two electromagnetic sliders, the mounting frame is ring-shaped, the electromagnetic tracks are embedded in the inner wall of the crushing cylinder so that an outer ring surface of the mounting frame abuts against the inner wall of the crushing cylinder.

Further, the inner ring surface of the mounting frame is provided with a mounting slot, a locking motor is fixedly mounted in the mounting slot, a rotation axis of an output end of the locking motor is perpendicular to the axis of the crushing cylinder, the material tumbling plate is circular, an outer circumference of the material tumbling plate is fixedly connected to the output end of the locking motor, and the diameter of the material tumbling plate is equal to the diameter of the inner ring of the mounting frame.

Further, the intermittent material discharge mechanism includes an opening opened at the bottom of the crushing cylinder, a discharge plate fixedly connected within the opening, at least two discharge ports evenly arranged along a circumferential direction of the discharge plate, a rotating plate abutting against a lower side of the discharge plate, at least two discharge outlets evenly arranged along a circumferential direction of the rotating plate, a rotating member connected to the rotating plate, and the rotating member drives the rotating plate to rotate along the axis of the crushing cylinder, causing the discharge outlets to sequentially align with the discharge ports.

The advantages of the present application are as follows.

With the crushing knife set located at the bottom of the crushing cylinder to crush the medical waste, the intermittent material discharge mechanism discharges the waste at the bottom as it gets gradually crushed. Simultaneously, the pressurizing mechanism moves towards the crushing knife set and gradually presses down the waste from the top, allowing the crushing knife to set to crush it. The material tumbling plate rotates to flip the waste on top, ensuring that the top garbage fully contacts the disinfection spray in the crushing cylinder, thereby enhancing the disinfection effect. As the medical garbage passes the material tumbling plate, the material tumbling plate adsorbs the metal objects in the medical garbage to prevent damage to the knives when the crushing knife set is crushing. Additionally, with the movement of the pressurizing mechanism, the mounting frame scrapes the inner wall of the crushing cylinder to scrape off the garbage adhered to the inner wall of the crushing cylinder, preventing the medical waste from remaining inside the crushing cylinder.

DETAILED DESCRIPTION OF THE EMBODIMENTS

The specific embodiments provided by the present application are described in detail below in conjunction with the accompanying drawings.

The present application will be described in detail below in conjunction with the accompanying FIGS. 1 to 6 to provide a clear and complete description of the technical solutions in embodiments of the present application. Obviously, the embodiments described are only a part of the embodiments of the present application, and not all of them. Based on the embodiments in the present application, all other embodiments obtained without creative labor by a person of ordinary skill in the art fall within the scope of protection of the present application.

Figure 3:
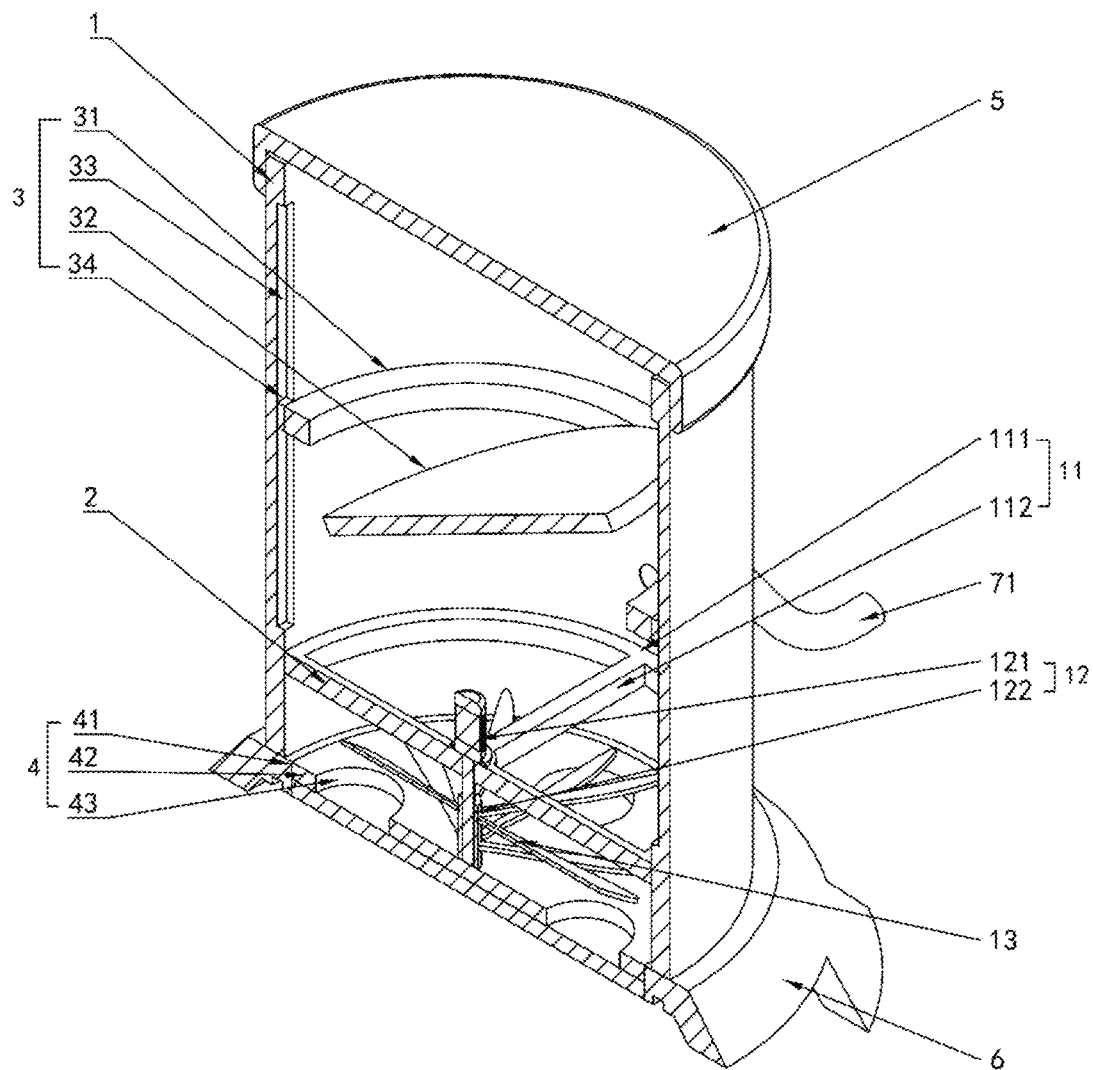
FIG. 3 is an isometric sectional view at A-A in FIG. 2 of the present application.
Figure 4:
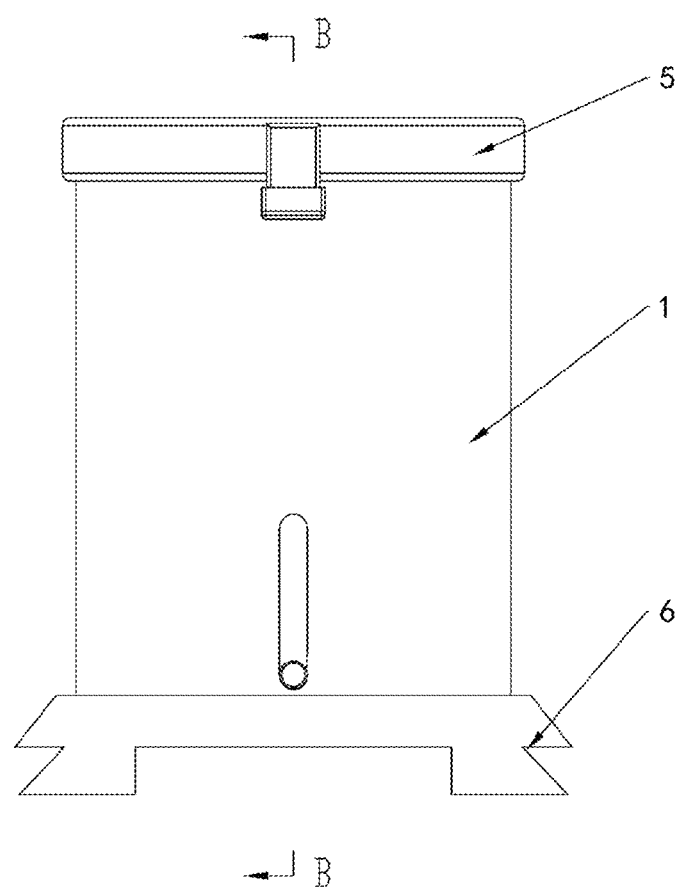
FIG. 4 is a left view of FIG. 1 of the present application.

As shown in FIG. 3, the present application is a high crushing efficiency medical waste treatment machine, which includes a crushing cylinder 1, a crushing knife set 2 provided at the bottom of the crushing cylinder 1, an intermittent material discharge mechanism 4 set on one side of the crushing knife set, a pressurizing mechanism 3 slidably set along the axis of the crushing cylinder 1 on the other side of the crushing knife set.

The pressurizing mechanism 3 includes a mounting frame 31 slidably connected to the inner wall of the crushing cylinder, the mounting frame 31 rotatably connected to a material tumbling plate 32, the material tumbling plate 32 has a rotation axis perpendicular to the axis of the crushing cylinder, and the material tumbling plate 32 is made of magnetic material.

When the intermittent material discharging mechanism discharges material, the pressurizing mechanism 3 moves towards the crushing knife set 2; when the intermittent material discharging mechanism stops discharging material, the material tumbling plate 32 rotates.

With the crushing knife set 2 located at the bottom of the crushing cylinder 1 to crush the medical waste, and as the medical waste at the bottom is gradually crushed, the intermittent material discharge mechanism 4 discharges the waste at the bottom. Simultaneously, the pressurizing mechanism 3 moves towards the crushing knife set 2 and gradually presses down the waste located on top, allowing the crushing knife to set to crush it. As the material tumbling plate 32 rotates and turns the waste at the top, the top garbage is fully contacted with the disinfection spray in the crushing cylinder 1 to improve the disinfection effect. Additionally, when the medical garbage passes the tumbling plate 32, the tumbling plate 32 adsorbs the metal objects in the medical garbage to prevent damage to the knives when the crushing knife set 2 is crushing, and with the movement of the pressurizing mechanism 3, the mounting frame 31 scrapes the inner wall of the crushing cylinder 1 to scrape off the garbage adhered to the inner wall of the crushing cylinder 1, preventing the medical waste from remaining inside the crushing cylinder 1.

Figure 1:
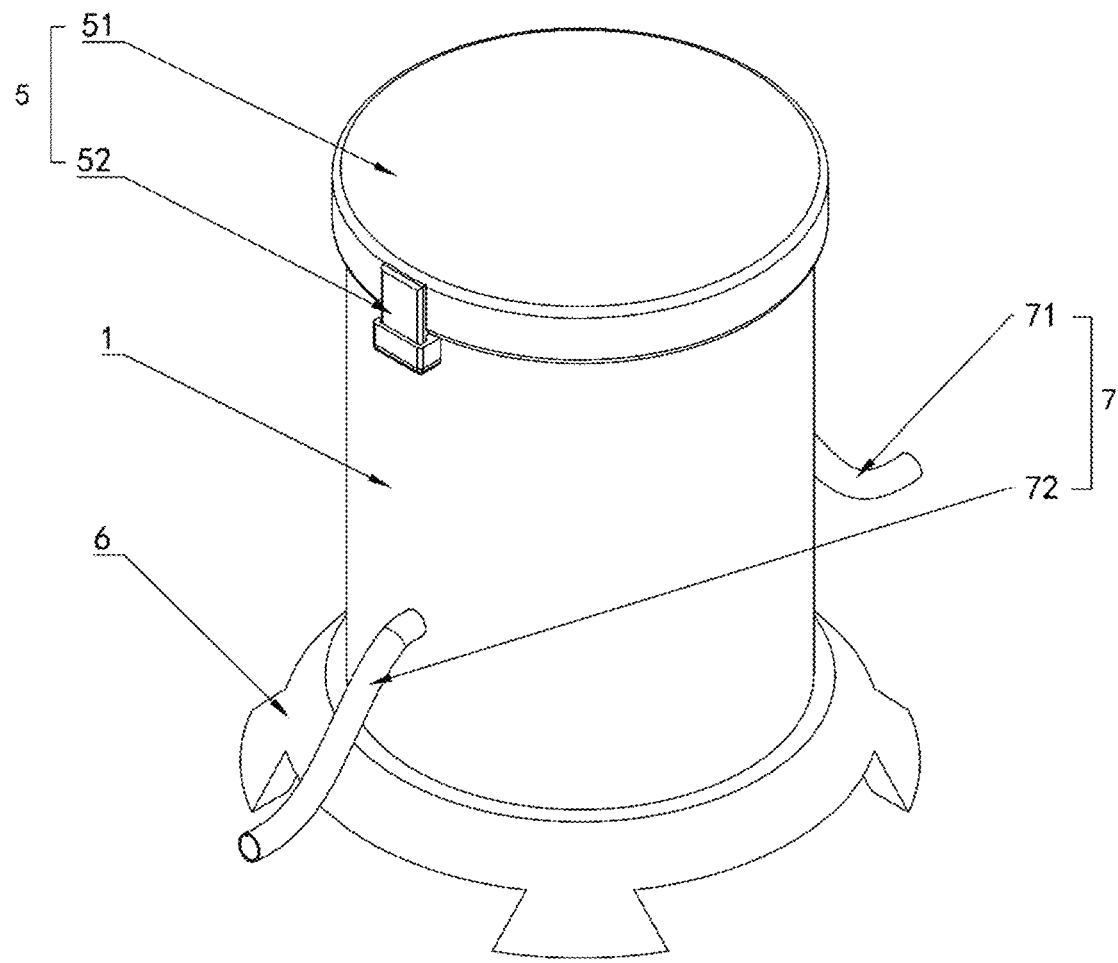
FIG. 1 is a three-dimensional view of the present application.
Figure 2:
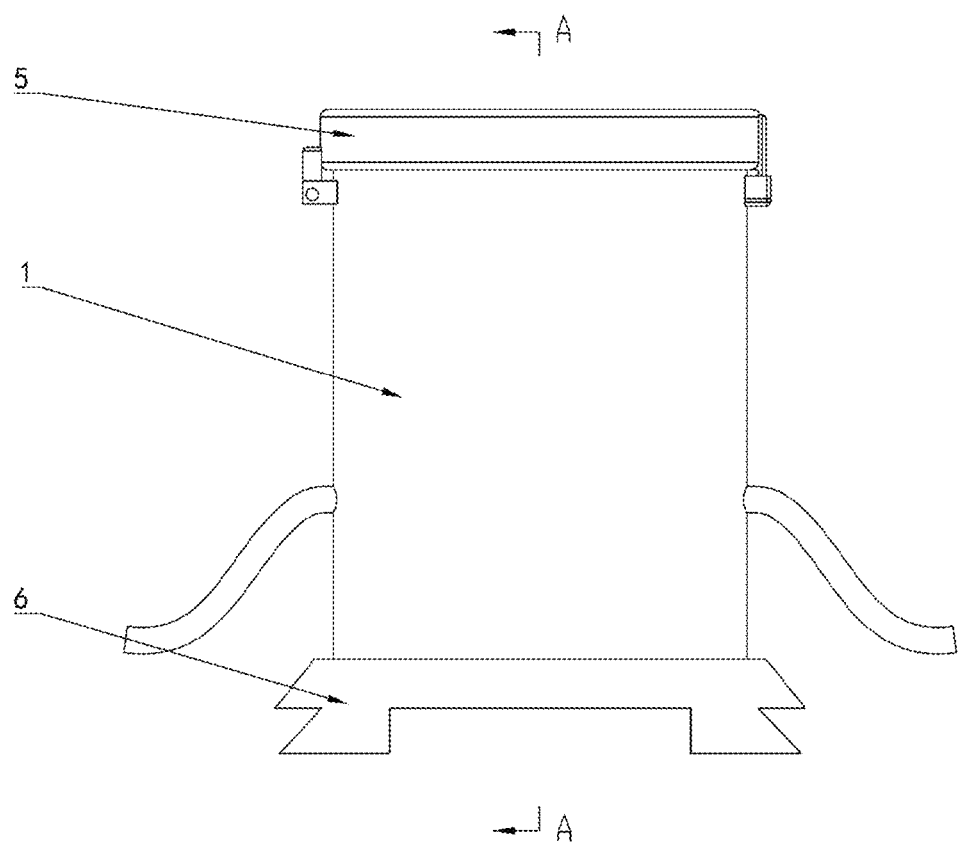
FIG. 2 is a front view of the present application.

Further, as shown in FIGS. 1 and 2, the top of the crushing cylinder is provided with a closure mechanism 5, the closure mechanism 5 includes a closure cap 51, one end of the closure cap 51 is connected to the crushing cylinder 1, the other end of the closure cap 51 is provided with a snap 52 between the closure cap 51 and the crushing cylinder 1.

In use, the snap 52 is opened, the closing cap 51 is opened, medical waste is placed into the crushing cylinder 1, then the closing cap 51 is covered, the opening on the upper side of the crushing cylinder 1 is closed, and then the snap 52 is fastened.

Further, as shown in FIG. 1, the crushing cylinder 1 has a base 6 fixedly attached to the bottom end of the crushing cylinder 1.

Further, the crushing cylinder 1 is communicatively connected with a disinfection mechanism 7, the disinfection mechanism 7 includes an intake pipe 71 with one end communicating with the crushing cylinder 1, the other end of the intake pipe 71 is communicatively connected to a disinfection device, and an exhaust pipe 72 with one end communicating with the crushing cylinder 1, and the other end of the exhaust pipe is communicatively connected to a recycling device.

The disinfection mechanism 7 is provided so that the treatment machine can disinfect the medical waste inside the crushing cylinder 1 to avoid environmental pollution when processing medical waste.

The disinfection mechanism and recycling device are prior arts and will not be repeated.

As shown in FIG. 3, the crushing knife set 2 includes a mounting member 11 fixedly connected to the inner wall of the crushing cylinder 1, the mounting member 11 is provided with a power member 12, whose output end is positioned on the axis of the crushing cylinder 1. the output end of the power member 12 is provided with two sets of crushing knives 13 along the axis direction, with the two sets of crushing knives 13 being staggered in the circumferential direction.

The staggered arrangement of the two sets of crushing knives 13 ensures a more thorough crushing of the medical waste, thereby improving crushing efficiency.

Further, as shown in FIG. 3, the mounting member 11 includes a mounting ring 111 fixedly connected to the inner wall of the crushing cylinder 1, the mounting ring 111 has a cross-shaped mounting fork 112 fixedly connected to the inner ring surface of the mounting ring 111, and the power member 12 is provided at the center part of the mounting fork 112.

Further, as shown in FIG. 3, the power member 12 includes a motor 121 fixedly mounted in the central part of the mounting fork 112. The output end of the motor 121 extends downward, passing through the mounting fork 112.

Further, as shown in FIG. 3, the output end of the motor 121 is fixedly provided with a mounting sleeve 122, and the crushing knives 13 are fixedly attached to the mounting sleeve 122.

As shown in FIG. 3, the pressurizing mechanism 3 includes two electromagnetic tracks 33 symmetrically provided on the inner wall of the crushing cylinder 1. Each electromagnetic track 33 is slidably connected with an electromagnetic slider 34. The mounting frame 31 is fixedly connected to the two electromagnetic sliders 34, the mounting frame 31 is annular in shape, the electromagnetic tracks 33 are embedded in the inner wall of the crushing cylinder 1 so that the outer ring surface of the mounting frame 31 abuts against the inner wall of the crushing cylinder 1.

By the arrangement of the electromagnetic tracks 33 and the electromagnetic sliders 34, the pressurizing mechanism 3 can slide along the axis of the crushing cylinder 1, thus driving the material tumbling plate 32 to apply pressure on the medical waste, resulting in a more thorough crushing by the crushing knife set 2.

Figure 5:
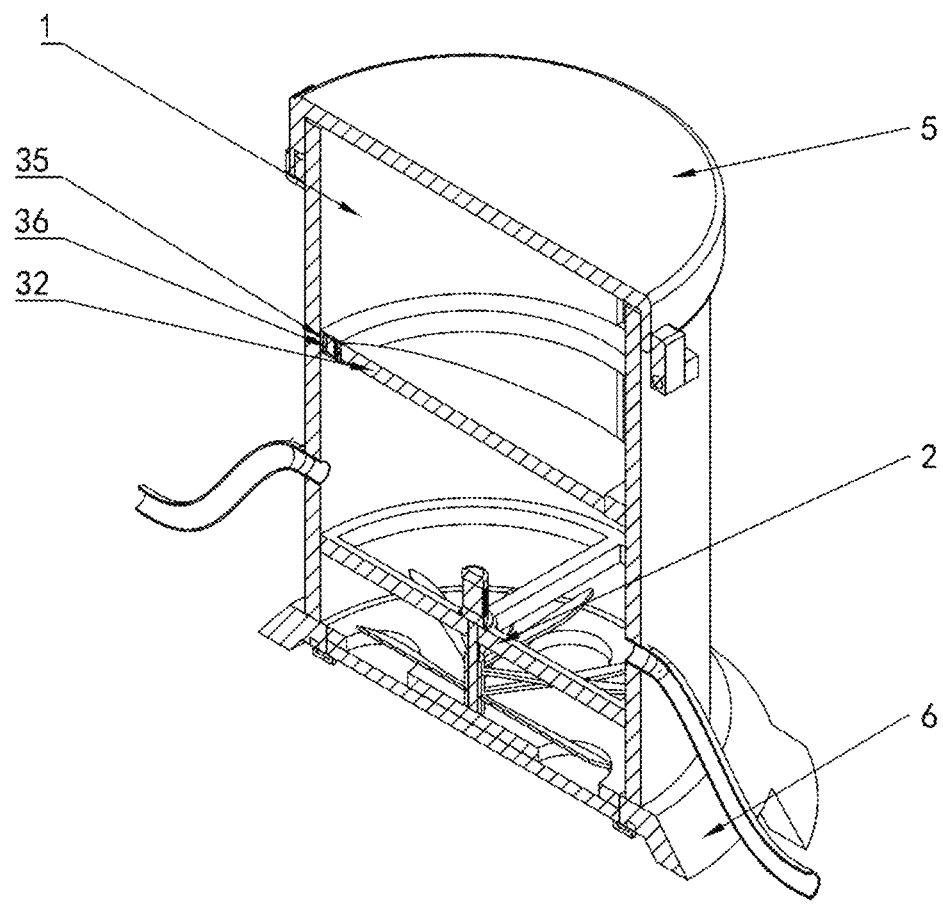
FIG. 5 is an isometric sectional view at B-B in FIG. 4 of the present application.

As shown in FIG. 5, there is a mounting slot 35 in the inner ring surface of the mounting frame 31, a locking motor 36 is fixedly installed in the mounting slot 35, the rotation axis of the output end of the locking motor 36 is perpendicular to the axis of the crushing cylinder 1, the material tumbling plate 32 is circular, the outer circumference of the material tumbling plate 32 is fixedly connected with the output end of the locking motor 36, the diameter of the material tumbling plate 32 is equal to the diameter of the inner ring of the mounting frame 31.

With the setup of the locking motor 36, during the crushing process, the locking motor 36 can drive the material tumbling plate 32 to flip the waste on top to ensure it fully contacts the disinfection spray inside the crushing cylinder 1. Additionally, when the pressurizing mechanism 3 moves downward, the locking motor 36 can keep the material tumbling plate 32 on the same horizontal plane as the mounting frame 31, ensuring more thorough pressing of the medical waste. The material tumbling plate 32 is made of magnetic material, so that metal impurities can be adsorbed on the material tumbling plate 32 when the waste is poured into the crushing cylinder 1 and passing through the material tumbling plate 32, reducing damage to the blades.

As shown in FIG. 5, the intermittent material discharge mechanism 4 includes an opening 41 opened at the bottom of the crushing cylinder 1; a material discharge plate 42 is fixedly connected within the opening 41; the material discharge plate 42 has four discharge ports 43 evenly opened in the circumferential direction; the lower side of the material discharge plate 42 abuts against a rotating plate 44, which also has four discharge ports 46 evenly arranged along the circumferential direction; the rotating plate 44 is connected to a rotating member 45, which drives the rotating plate 44 to rotate along the axis of the crushing cylinder 1, so that the discharge outlets 46 align with the discharge ports 43 in turn.

By the setting of the discharge outlets 46 and the discharge ports 43, the discharge outlets 46 align with the discharge ports 43 in turn when the rotating plate 44 is rotated, achieving intermittent discharge. With the setting of the pressurizing mechanism 3 and the crushing knife set 2, the garbage close to the crushing knife set 2 is discharged after crushing, then the garbage located in the upper part is pressed by the pressurizing mechanism 3 towards the position close to the crushing knife set 2. Under pressure, this ensures a more thorough crushing process.

Figure 6:
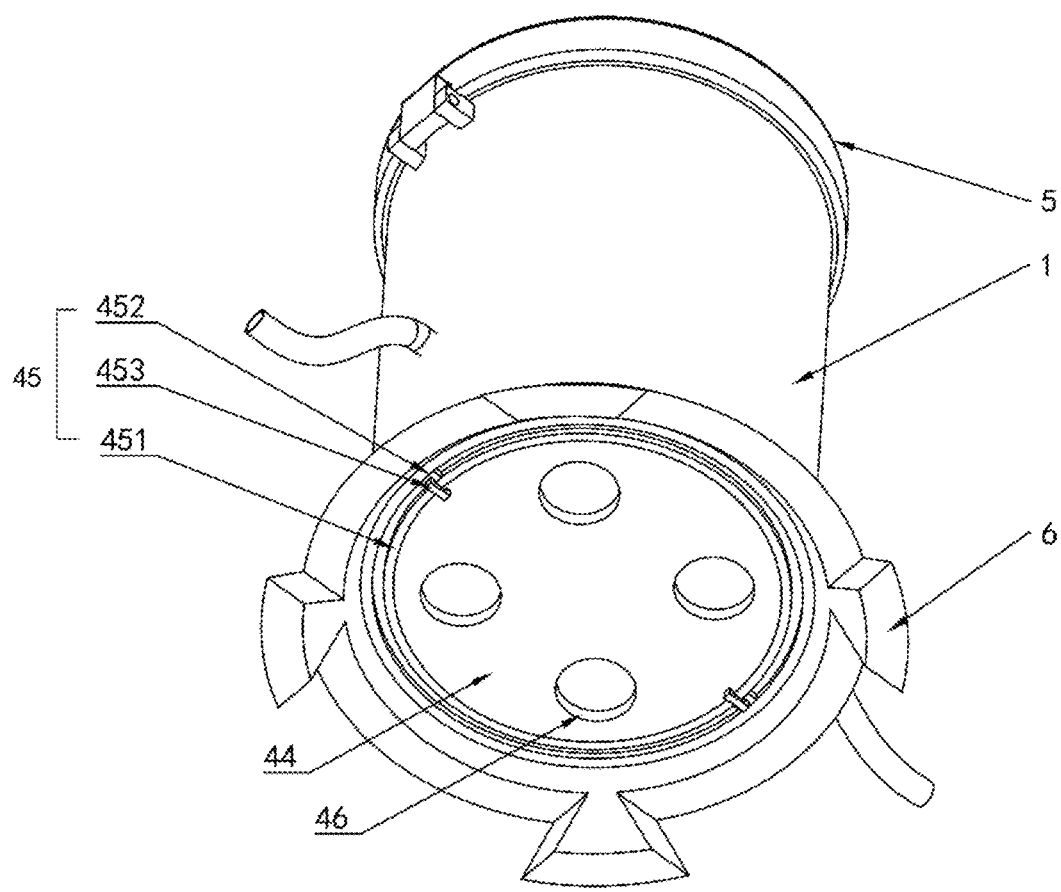
FIG. 6 is a bottom view of the present application.

Further, as shown in FIG. 6, the rotating member 45 includes a ring electromagnetic track 451 provided on the bottom surface of the crushing cylinder 1. A discharge slider 452 is slidably connected within the ring electromagnetic track 451. A connecting rod 453 is fixedly connected between the discharge slider 452 and the rotating plate 44.

The discharge slider 452 moves circumferentially within the annular electromagnetic track 451, driving the rotating plate 44 to rotate through the connecting rod 453. Since the rotating part 45 is located on the periphery of the rotating plate 44, it prevents the waste from being obstructed during discharge.

The electromagnetic track and the electromagnetic slider are existing technologies and will not be further elaborated.

The above descriptions are merely preferred embodiments of the present application. It should be noted that those skilled in the art can make several improvements and supplements without departing from the method of the present application, and these improvements and supplements should also be regarded as within the scope of the present application.

What is claimed is:

1. A high crushing efficiency medical waste treatment machine, comprising a crushing cylinder, a crushing knife set arranged at a bottom of the crushing cylinder, an intermittent material discharge mechanism arranged on one side of the crushing knife set, a pressurizing mechanism slidingly arranged along an axis of the crushing cylinder on the other side of the crushing knife set; wherein the pressurizing mechanism comprises a mounting frame slidingly connected to an inner wall of the crushing cylinder, a material tumbling plate is rotatably connected within the mounting frame, with a rotation axis of the material tumbling plate perpendicular to the axis of the crushing cylinder, and the material tumbling plate is made of a magnetic material;

when the intermittent material discharging mechanism discharges material, the pressurizing mechanism moves in a direction towards the crushing knife set, and when the intermittent material discharging mechanism stops discharging material, the material tumbling plate rotates;

the pressurizing mechanism comprises two electromagnetic tracks symmetrically arranged in the inner wall of the crushing cylinder, each electromagnetic track is slidably connected with an electromagnetic slider; the mounting frame is fixedly connected to the two electromagnetic sliders, the mounting frame is ring-shaped, the electromagnetic tracks are embedded in the inner wall of the crushing cylinder so that an outer ring surface of the mounting frame abuts against the inner wall of the crushing cylinder;

the inner ring surface of the mounting frame is provided with a mounting slot, a locking motor is fixedly mounted in the mounting slot, a rotation axis of an output end of the locking motor is perpendicular to the axis of the crushing cylinder, the material tumbling plate is circular, an outer circumference of the material tumbling plate is fixedly connected to the output end of the locking motor, and the diameter of the material tumbling plate is equal to the diameter of the inner ring of the mounting frame;

the intermittent material discharge mechanism comprises an opening opened at the bottom of the crushing cylinder, a discharge plate fixedly connected within the opening, at least two discharge ports evenly arranged along a circumferential direction of the discharge plate, a rotating plate abutting against a lower side of the discharge plate, at least two discharge outlets evenly arranged along a circumferential direction of the rotating plate, a rotating member connected to the rotating plate, and the rotating member drives the rotating plate to rotate along the axis of the crushing cylinder, causing the discharge outlets to sequentially align with the discharge ports.

2. The high crushing efficiency medical waste treatment machine according to claim 1, wherein a top of the crushing cylinder is provided with a closure mechanism, the closure mechanism comprises a closure cap, one end of the closure cap is hinged to the crushing cylinder, the other end of the closure cap is provided with a snap between the closure cap and the crushing cylinder, and a bottom end of the crushing cylinder is fixedly connected with a base.

3. The high crushing efficiency medical waste treatment machine according to claim 1, wherein the crushing cylinder is communicatively connected with a disinfection mechanism, the disinfection mechanism comprises an intake pipe with one end communicating with the crushing cylinder, the other end of the intake pipe is communicatively connected to a disinfection device, and an exhaust pipe with one end communicating with the crushing cylinder, and the other end of the exhaust pipe is communicatively connected to a recycling device.

4. The high crushing efficiency medical waste treatment machine according to claim 1, wherein the crushing knife set comprises a mounting member fixedly connected to the inner wall of the crushing cylinder, a power member is arranged on the mounting member, and the output end of the power member is located in the axis of the crushing cylinder, the output end of the power member is provided with two sets of crushing knives along the axial direction, with the two sets of crushing knives being staggered in a circumferential direction.

* * * * *